US010028190B2

(12) United States Patent
Aso et al.

(10) Patent No.: US 10,028,190 B2
(45) Date of Patent: *Jul. 17, 2018

(54) MOBILE TERMINAL

(71) Applicant: Sun Patent Trust, New York, NY (US)

(72) Inventors: Keigo Aso, Kanagawa (JP); Jun Hirano, Kanagawa (JP); Chan Wah Ng, Singapore (SG); Pek Yew Tan, Singapore (SG); Chun Keong Benjamin Lim, Singapore (SG); Tien Ming Benjamin Koh, Singapore (SG)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/471,827

(22) Filed: Mar. 28, 2017

(65) Prior Publication Data

US 2017/0201921 A1    Jul. 13, 2017

Related U.S. Application Data

(63) Continuation of application No. 14/869,373, filed on Sep. 29, 2015, now Pat. No. 9,642,057, which is a
(Continued)

(30) Foreign Application Priority Data

Sep. 27, 2007    (JP) ................................. 2007-251831

(51) Int. Cl.
*H04W 36/34* (2009.01)
*H04W 36/14* (2009.01)
(Continued)

(52) U.S. Cl.
CPC ............ *H04W 36/14* (2013.01); *H04L 45/22* (2013.01); *H04W 12/08* (2013.01); *H04W 28/08* (2013.01);
(Continued)

(58) Field of Classification Search
CPC . H04W 36/14; H04W 36/36; H04W 36/0055; H04W 92/02
(Continued)

(56) References Cited

U.S. PATENT DOCUMENTS 5,615,263 A    3/1997 Takahashi
7,146,133 B2   12/2006 Bahl et al.
(Continued)

FOREIGN PATENT DOCUMENTS

JP    2004-509539 A    3/2004
WO      02/23362 A1    3/2002
(Continued)

OTHER PUBLICATIONS

European Search Report, dated Aug. 29, 2016, for corresponding EP Application No. 08833875.1-1857 / 2194737, 4 pages. (With English Translation).
(Continued)

*Primary Examiner* — Cong Tran
(74) *Attorney, Agent, or Firm* — Seed IP Law Group LLP

(57) ABSTRACT

A technique is disclosed, according to which a mobile node, having a plurality of interfaces and performing communication according to flow information when an operator is performing communication based on the flow information as defined by a policy, can select an interface suitable for the flow and can perform communication. According to this technique, a mobile node (MN 10) having a plurality of interfaces has a list to indicate domain limited flows to be transmitted only within a specific network (a trusted network), and a list to indicate the trusted networks. When a certain interface performs handover, and in case there is a domain limited flow that uses the interface, it is decided whether the network of handover destination is a trusted network or not, and in case the network of the handover
(Continued)

destination is not a trusted network, it is decided whether it is possible or not to transmit and receive the domain limited flow via another interface that is connected to the trusted network.

6 Claims, 11 Drawing Sheets

Related U.S. Application Data continuation of application No. 14/242,637, filed on Apr. 1, 2014, now Pat. No. 9,178,803, which is a continuation of application No. 12/678,729, filed as application No. PCT/JP2008/002592 on Sep. 19, 2008, now Pat. No. 8,731,547.

(51) Int. Cl.
*H04W 12/08* (2009.01)
*H04W 36/36* (2009.01)
*H04L 12/707* (2013.01)
*H04W 92/02* (2009.01)
*H04W 36/00* (2009.01)
*H04W 28/08* (2009.01)
*H04W 60/00* (2009.01)
*H04W 88/06* (2009.01)
*H04W 76/20* (2018.01)

(52) U.S. Cl.
CPC ....... *H04W 36/0055* (2013.01); *H04W 36/36* (2013.01); *H04W 92/02* (2013.01); *H04W 60/005* (2013.01); *H04W 76/20* (2018.02); *H04W 88/06* (2013.01)

(58) Field of Classification Search
USPC ......... 455/414.1, 403, 550.1, 444, 445, 448, 455/434, 436, 435.2; 370/352, 401, 328, 370/331, 349
See application file for complete search history.

(56) References Cited

U.S. PATENT DOCUMENTS

| | | | |
|---|---|---|---|
| 7,463,607 B2 | 12/2008 | Sood et al. | |
| 7,564,812 B1 | 7/2009 | Elliott | |
| 7,903,553 B2 | 3/2011 | Liu | |
| 7,912,457 B2 | 3/2011 | Chandhok et al. | |
| 8,340,711 B1 | 12/2012 | Glass et al. | |
| 8,478,304 B1 | 7/2013 | David et al. | |
| 8,599,795 B2 | 12/2013 | Sarikaya et al. | |
| 2004/0259545 A1 | 12/2004 | Morita | |
| 2006/0182061 A1 | 8/2006 | Naghian | |
| 2006/0217147 A1 | 9/2006 | Olvera-Hernandez et al. | |
| 2007/0004393 A1 | 1/2007 | Forsberg et al. | |
| 2007/0153986 A1 | 7/2007 | Bloebaum et al. | |
| 2008/0002692 A1 | 1/2008 | Meylan et al. | |
| 2008/0137615 A1 | 6/2008 | Park et al. | |
| 2008/0220772 A1 | 9/2008 | Islam et al. | |
| 2008/0259848 A1 | 10/2008 | Aso et al. | |
| 2009/0061870 A1* | 3/2009 | Finkelstein | H04W 48/20 455/435.2 |
| 2010/0020775 A1 | 1/2010 | Tomizu | |

FOREIGN PATENT DOCUMENTS

| | | |
|---|---|---|
| WO | 03/040861 A2 | 5/2003 |
| WO | 2006/078627 A2 | 7/2006 |
| WO | 2006/093288 A1 | 9/2006 |
| WO | 2007/043927 A1 | 4/2007 |

OTHER PUBLICATIONS

International Search Report, dated Dec. 16, 2008, for corresponding International application No. PCT/JP2008/002592, 2 pages.
Johnson et al., "Mobility Support in IPv6," IETF, Network Working Group, Request for Comments: 3775, Jun. 2004, pp. 1-166.
Koodli et al., "Fast Handovers for Mobile IPv6," IETF, Network Working Group, Request for Comments: 4068, Jul. 2005, pp. 1-42.
Office Action, dated May 11, 2012, for corresponding Japanese Application No. 2009-534166, 4 pages.
Office Action, dated Jun. 25, 2013, for corresponding Japanese Application No. 2012-189477, 2 pages.
Soliman et al., "Flow Bindings in Mobile IPv6 and Nemo Basic Support," IETF MONAMI6 Working Group, Internet-Draft, Feb. 2007, pp. 1-37.
Wakikawa et al., "Multiple Care-of Addresses Registration," Monami6 Working Group, Internet-Draft, Intended status: Standards Track, Mar. 5, 2007, pp. 1-41.

* cited by examiner

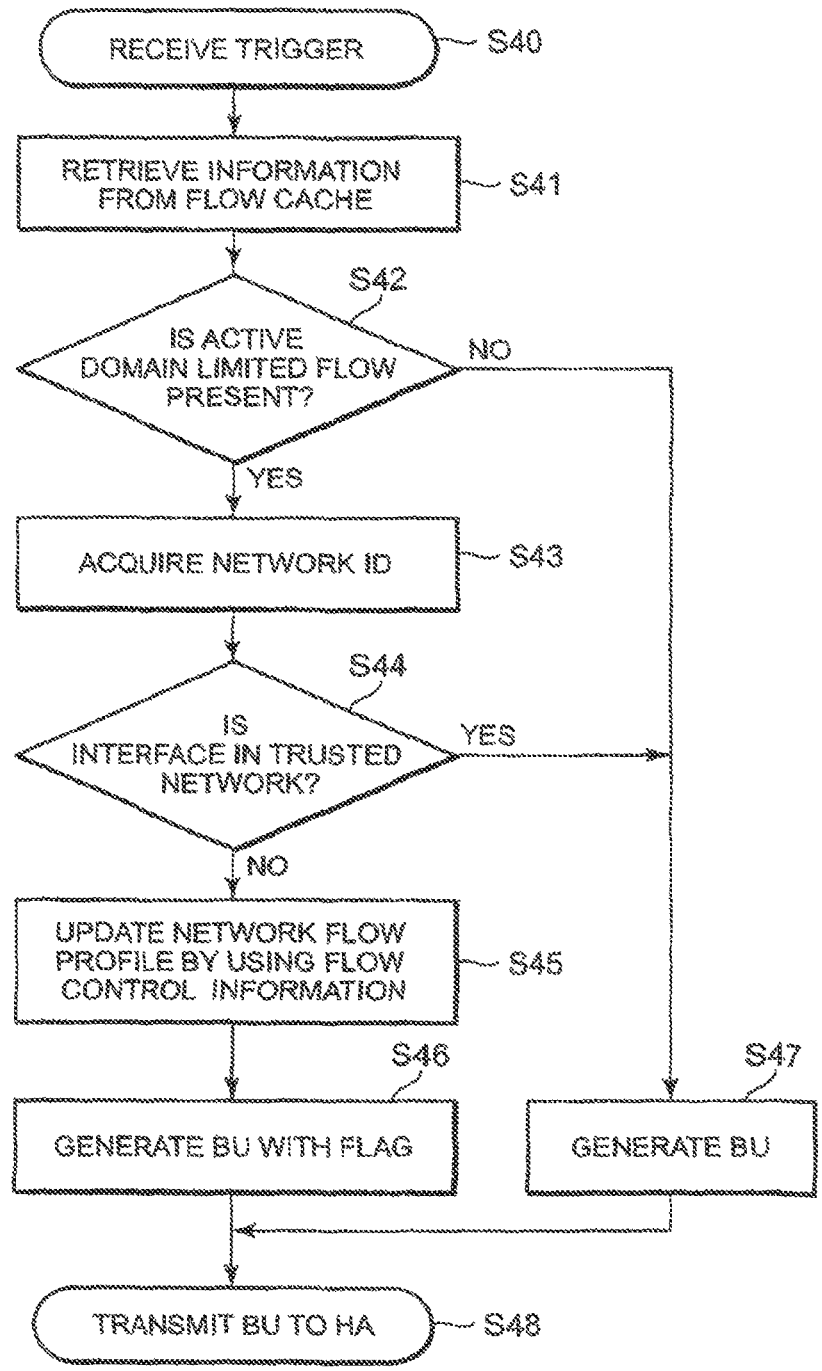

MOBILE TERMINAL

BACKGROUND

Technical Field

The present invention relates to a network node and a mobile terminal relating to a communication technique using the Internet Protocol (IP). In particular, the invention relates to a network node and a mobile terminal for performing processing to change a route of flow.

Description of the Related Art

In the Non-Patent Document 1 as given below, for instance, a technique is disclosed, according to which a mobile node (MN) associates and registers a care-of address (CoA) and a home address (HoA) to its own home agent (HA) by using the mobile IPv6 (MIPv6). By this technique, the reachability of the mobile node can be accomplished even in case the mobile node is located at a location separated away from the home network.

On the other hand, when there are provided portable electronic devices where a plurality of network interfaces are incorporated, a mobile node has a function to register a plurality of CoA's (multiple CoA) to a predetermined home agent address. On this registration method, discussion is made in the Working Group of Monami6 (Mobile Nodes and Multiple Interfaces in IPv6) of IETF (Internet Engineering Task Force).

Also, in the Non-Patent Document 2 as given below, a technique is disclosed, according to which the multiple CoA can be registered by introducing Binding Unique Identification (BID), i.e., an identification number to identify a plurality of bindings to a single HoA. BID is assigned to an interface or to a CoA associated with a certain home address (HoA) of the mobile node. Therefore, HoA is associated with the mobile node, and BID identifies each binding registered by the mobile node. The mobile node notifies BID to its own home agent by Binding Update (BU), and the home agent records BID in a binding cache.

Further, in the Non-Patent Document 3 as given below; it is described that the routing of a traffic flow can be selectively performed by using a plurality of CoA's when the mobile node and/or the router set up preference information to the home agent. Each traffic flow is identified by unique flow identification information (FID), and the mobile node and/or the router can select CoA, to which the routing of a specific traffic flow should be made, and the FID is associated with a suitable BID, and this can be registered to HA.

However, the setting of the preference relating to the traffic flow route is not always made by the mobile node and/or the router. Under a certain circumstance, operation to select a suitable route of the traffic flow is carried out by a service provider that performs communication with the mobile node and/or the router. For instance, it is supposed here that a user of the mobile node receives "i mode" (registered trademark) from the service provider. The traffic of "i mode" (registered trademark) is a traffic flow restricted within a domain, and this traffic flow is transmitted only within a trusted network of the service provider. As to be described later, the restricted traffic flow where transmission is performed only within a certain domain is referred to as "domain limited flow" in the present specification. In such case, an entity (e.g., HA) belonging to the service provider notifies the mobile node by defining a method to forward the domain limited flow. By the notification of the information, the service provider can control the forwarding of the domain limited flow by the mobile node.

The interface of the mobile node can be shifted (change of connection or changeover of connection) to a different access network. Therefore, the interface of the mobile node may be shifted from a trusted network to a non-trusted network. As to be described below, a network directly managed by a certain service provider or managed by an operator, which is in trust relation, is referred to as a trusted network in the present specification, and a network other than the trusted network is referred as a non-trusted network.

However, when it is shifted to the non-trusted network, a network flow profile generated by the service provider may not be updated to the newest information. For instance, in case a domain limited flow is transferred via an interface while the mobile node is moving, the mobile node must make up filter rules relating to the domain limited flow according to a network profile generated by the service provider, and there is a possibility that the domain limited flow may be forwarded to the non-trusted network by referring to a network flow profile, which is not updated.

Specifically, according to the conventional method to notify the flow information from the network side (e.g., from HA) to the mobile node, even after the network where the interface is connected is changed over due to the moving of the mobile node, the mobile node itself cannot correctly decide whether the interface may be continuously used as an interface to transmit and receive a packet relating to the flow. Also, when it is wanted to transmit and receive the flow via the other interface in order to prevent packet loss during the handover, the mobile node itself cannot correctly decide whether or not the flow may be transmitted via the interface that is not specified in the flow information.

To solve this problem, there is a method to use a network trigger that is transmitted before the interface of the mobile node changes over the connection point. For instance, it is supposed here that the mobile node has a 3G (third generation) cellular interface and a WLAN (Wireless Local Area Network) interface, and that these two interfaces are present in a trusted access network.

The access point, to which the WLAN interface is connected, constantly monitors the connection of the WLAN interface. For instance, the access point monitors a threshold level of electric power/signal intensity of the WLAN interface. When the access point detects that electric power/signal intensity from the WLAN interface reaches a value equal to or lower than the threshold level, it is decided that the WLAN interface has moved out of the communication range of the access point. Then, the access point transmits a trigger to the mobile node. This trigger is a "link going down" trigger as used in IEEE 802.21, for instance.

When the mobile node receives a trigger to indicate that WLAN interface is moving out of the communication range of the access point, a method based on the fast mobile IPv6 (FMIPv6) as defined in the Non-Patent Document 4 as given below is carried out, and it is tried to connect to an access point in the vicinity. By using FMIPv6, the mobile node can acquire a new CoA at an access point of the mobile destination of the interface.

The mobile node can transmit a binding update (BU) to update binding entry of the mobile node to HA by using this CoA. When the BU is received, HA checks whether CoA offered from the mobile node is made up by a prefix of the service provider or not.

If HA decides that the mobile node has moved to a non-trusted access network, the network flow profile of the mobile node is updated so that the domain limited flow is transmitted via the interface of the mobile node that is still present in the trusted access network. Then, HA notifies the mobile node to transfer the domain limited flow via HoA/CoA of the 3G interface by updating the network profile of the mobile node, for instance. The updated network profile is transmitted from HA by a binding acknowledgment (BA) to the mobile node.

Instead of the method, by which HA updates the network flow profile of the mobile node, there is a method that the mobile node has the function to update the network flow profile and notifies the change of the network flow profile to HA.

The Patent Document 1 as given below discloses an arrangement of application that is applied to a mobile node having a plurality of interfaces. In this case, the mobile node requests a profile specific to the application to activate the application mounted on the mobile node to the profile server. The profile server prepares or reads a profile specific to the application, and sends the profile specific to the application to the mobile node. Then, the mobile node can interpret this profile specific to the application as a policy rule to carry out selective control of one or more communication interfaces of the mobile node during the operation of the application.

As described above, according to the prior art, when MN registers a plurality of CoA's to HA, MN notifies flow information to HA for the purpose of specifying a CoA used as the transfer destination of the packet to HA. The flow information is to specify the CoA, to which a specific flow transmitted and received by MN is to be transferred. HA selects the transfer destination of the packet to MN according to this flow information notified from MN.

On the other hand, similar flow information can be notified from HA to MN. In this case, the flow information is generated according to a policy of the network side. When the packet is transmitted, MN selects an interface to be used according to the flow information notified from HA.

[Patent Document 1] U.S. Patent Application Publication No. 2007-0004393

[Non-Patent Document 1] D. Johnson, C. Perkins, and J. Arkko: "Mobility Support in IPv6"; Internet Engineering Task Force, Request for Comments 3775; June 2004.

[Non-Patent Document 2] R. Wakikawa, T. Ernst, and K. Nagami: "Multiple Care-of Addresses Registration"; Monami6 Working Group Internet Draft, Mar. 5, 2007.

[Non-Patent Document 3] H. Soliman, K. ElMalki, and C. Castelluccia: "Flow Bindings in Mobile IPv6 and Nemo Basic Support"; Internet Engineering Task Force Internet Draft; February 2007.

[Non-Patent Document 4] R. Koodli, Editor: "Fast Handovers for Mobile IPv6"; Internet Engineering Task Force Request for Comments 4068; July 2005.

However, in the method to use the network trigger to be received prior to the changeover of the connection point as described above, the access point must have the function to detect connectivity of the interface of the mobile node (i.e., the function to detect cutoff of the connection with the mobile node in advance and to have the trigger). Also, a problem may arise that the mobile node should be provided with FMIPv6 for acquiring CoA prior to the handover. For instance, in case the access point does not have the function to detect the connectivity of the interface of the mobile node, delay may occur before the mobile node receives the updated network flow profile, and the mobile node may forward the domain limited flow via the non-trusted network because of the delay.

Also, when the electric power and/or signal intensity of the interface of the mobile node changes near the threshold level as defined at the access point, there is a problem in this method that the access point may continuously transmit the network trigger, suggesting the possibility that the link of the interface may be cut off to the mobile node.

As a result, there may arise the problems such as: a problem that a multiple of network triggers may be continuously transmitted from the access point to the mobile node, or a problem that the mobile node may update redundant binding entry according to a multiple of network triggers, and a multiple of the network flow profiles may be transmitted from HA to the mobile node. As a result, the load of the processing in the range of the network or the devices may be consumed uselessly.

According to the technique disclosed in the Patent Document 1, the mobile node selects an interface by referring to the profile specific to the application as stored in the mobile node, but there is no mention on a method to update the profile or a method to change over the interface in case network status has changed due to the handover or to the change of network environment.

BRIEF SUMMARY

To solve the above problems, the present invention provides an arrangement so that a mobile node (mobile terminal) having a plurality of interfaces and performing communication according to flow information defined by an operator based on a policy can select an interface suitable for the flow and can perform communication.

To attain the above object, the present invention provides a mobile terminal, which comprises
 a plurality of interfaces;
 flow information holding unit that holds flow information as notified from an operator of a network connected by one of said plurality of interfaces and holds flow information to specify an interface for transmitting and receiving the flow; and
 confirming unit that confirms, regarding a specific flow, whether it is possible or not to have communication via another interface different from an interface specified in advance by said flow information.

With the arrangement as described above, the mobile node itself that has a plurality of interfaces and performing communication according to flow information defined by an operator based on a policy, can perform communication by selecting an interface suitable for the flow.

Also, in addition to the above arrangement, the mobile terminal of the present invention provides the mobile terminal as described above, wherein:
 flow identification information holding unit that holds information for identifying a flow transmissible and receivable only via a specific network;
 network identification information holding unit that holds information to identify said specific network; and
 said confirming unit is designed to confirm whether it is possible or not to perform communication via said another interface regarding said specific flow according to the information held by said flow information holding unit and said network identification information holding unit.

With the arrangement as described above, it is possible to confirm whether transmission and receiving can be carried out by using the other interface with respect to a domain limited flow that is transmitted and received via a certain interface.

Further, in addition to the above arrangement, the mobile terminal of the present invention provides the mobile terminal as described above, wherein:

said confirming unit decides whether said specific flow is a flow transmissible and receivable only via said network according to the information held by said flow identification information holding unit, and in case said specific flow is a flow transmissible and receivable only via said specific network, it is further decided whether said another interface is connected to a specific network or not, and in case said another interface is connected to said specific network, it is decided that communication via said another interface can be performed on said specific flow.

With the arrangement as described above, it is possible to confirm whether transmission and receiving can be carried out by using the other interface with respect to a domain limited flow that is transmitted and received via a certain interface.

Also, in addition to the above arrangement, the mobile terminal of the present invention provides the mobile terminal as described above, wherein:

said confirming unit decides whether said specific flow is a flow transmissible and receivable only via said specific network according to the information held by said flow identification information holding unit, and in case said specific flow is not a flow transmissible and receivable only via said specific network, it is decided that the interface now in use can be continuously used.

With the arrangement as described above, it is possible to confirm whether transmission and receiving can be carried out by continuously using the present interface with respect to a domain limited flow that is transmitted and received via a certain interface.

Further, in addition to the above arrangement, the mobile terminal of the present invention provides the mobile terminal as described above, wherein:

said specific network is a network approved by said operator.

With the arrangement as described above, the domain limited flow can be transmitted only within the trusted network that is approved by the operator.

Also, in addition to the above arrangement, the mobile terminal of the present invention provides the mobile terminal as described above, wherein:

said mobile terminal comprises flow change requiring or non-requiring information holding unit that holds information as to whether it is necessary to change the flow information relating to said specific flow in case an interface transmitting and receiving a specific flow performs handover for each flow; and said confirming unit confirms whether it is necessary or not to change the flow information relating to said specific flow at the time of said handover.

With the arrangement as described above, it is possible to specify a CoA-bind flow where the change of the flow information is needed at the time of the handover.

Further, in addition to the above arrangement, the mobile terminal of the present invention provides the mobile terminal as described above, wherein:

said mobile terminal has network identification information holding unit that holds information to identify a specific network where said specific flow can be transmitted and received; and in case it is decided that it is necessary to change the flow information relating to said specific flow at the time of said handover according to the information held by said flow change requiring or non-requiring information holding unit, said confirming unit confirms whether communication via said another interface can be performed or not for said specific flow according to the information held by said network identification information holding unit.

With the arrangement as described above, it is possible to confirm whether transmission and receiving can be carried out by using the other interface with regard to the CoA-bind flow.

Also, in addition to the above arrangement, the mobile terminal of the present invention provides the mobile terminal as described above, wherein:

said mobile terminal has inquiry unit that makes inquiry to a predetermined communication device existing in said network as to whether or not communication via said another interface can be performed on said specific flow; and in case it is decided that it is necessary to change the flow information relating to said specific flow at the time of handover according to the information held by said flow change requiring or non-requiring information holding unit, said confirming unit decides that said inquiry unit makes inquiry as to whether it is possible or not to perform communication via said another interface on said specific flow.

With the arrangement as described above, when it is necessary to confirm whether transmission and receiving are carried out by using the other interface with respect to the CoA-bind flow, the mobile terminal can make an inquiry to a communication device that is located on the network side.

Further, to attain the above object, the present invention provides a network node as described above, wherein:

flow information notifying unit that notifies the flow information on a flow transmitted and received by a mobile terminal having a plurality of interfaces; and flow condition information notifying unit that notifies information, by which said mobile terminal can confirm whether communication can be performed or not via another interface different from an interface as specified in advance by said flow information with regard to a specific information.

With the arrangement as described above, the mobile node itself having a plurality of interfaces and performing communication according to the flow information defined by an operator based on a policy can perform communication by selecting an interface suitable for the flow.

Also, in addition to the above arrangement, the present invention provides the network node as described above, wherein:

flow identification information notifying unit that notifies information to identify said flow transmissible and receivable only via a specific network; and network identification information notifying unit that notifies information to identify said specific network.

With the arrangement as described above, the mobile terminal can confirm whether it is possible or not to perform transmission and receiving by using the other interface on a domain limited flow that is transmitted and received via a certain interface.

Further, in addition to the above arrangement, the present invention provides the network node as described above, wherein:

there is provided flow change requiring or non-requiring information notifying unit that notifies information as to whether it is necessary or not to change the flow information relating to said specific flow in case an interface transmitting and receiving a specific flow performs handover with regard to each flow of said mobile terminal.

With the arrangement as described above, it is possible to specify a CoA-bind flow, for which the change of the flow information is needed at the time of the handover.

Also, in addition to the above arrangement, the present invention provides the network node as described above, wherein:

said flow condition information notifying unit decides whether it is possible or not to perform communication via a specific interface with regard to said specific flow in case an inquiry relating to said specific flow and said specific interface is received from said mobile terminal and notifies the result of the judgment to said mobile terminal.

With the arrangement as described above, it is possible to give an adequate reply to an inquiry from a mobile terminal that needs confirmation as to whether it is possible or not to perform transmission and receiving via the other interface with regard to the CoA-bind flow.

The present invention has the arrangement as described above, and it has such effects that a mobile node having a plurality of interfaces and performing communication according to flow information defined by an operator based on a policy can perform communication by selecting an interface suitable for the flow.

BRIEF DESCRIPTION OF THE SEVERAL VIEWS OF THE DRAWINGS

FIG. 4 is a flowchart, showing an example of operation of a profile processor that receives a trigger to indicate the change of a connection point of a mobile node, in the first embodiment of the invention;

DETAILED DESCRIPTION

Description will be given below on the best aspect of the invention by referring to the attached drawings. In the following, detailed description may be given on specific number, time, or structure, and protocol name and other parameters, but specific conditions as used in the present specification are merely given to facilitate the explanation of the invention, and these are not used for limiting the scope of the present invention.

In the present specification, a method is disclosed, which is used by a mobile node (MN) having a plurality of interfaces to transmit and receive a traffic flow via an interface as appropriate.

To facilitate explanation, a term "network flow profile" is used below. This network flow profile represents a filter rule that is defined by a service operator of the mobile node for indicating a method to forward a traffic flow of the mobile node (i.e., a method, by which a traffic flow of a mobile node is forwarded from the mobile node (or to a mobile node)).

Further, a term "domain limited flow (domain limited flow)" is used to explain relation between a specific flow and a specific network when the specific flow is transmitted via the specific network. This domain limited flow indicates a traffic flow that a service provider must transmit only within a trusted network (a reliable network), to which a service provider can trust. The trusted network is a network that is approved by the service provider. For instance, it is a network, for which security is guaranteed. In the present specification, the relation between the domain limited flow and the trusted network is used as an example, to represent the relation between the specific flow and the network to transmit the flow, while the relation between these two is not limited to this. That is to say, in case a network suitable for the transmission of a specific flow is decided, the reason to associate these two does come into question. In the description as given below, a trusted flow list 310 and a trusted access list 311 are used as examples that are associated by common reasons of trust.

The trusted network is a network that is directly managed by the service provider, for instance. Further, a network managed by an operator that has an established security associated with the service provider, may be included. In the specification hereinafter, a network that does not have an established trust relation with the service provider (i.e., a network that the service provider does not trust (rely)) may be referred to as "non-trusted network (non-reliable network)".

Reasons why the domain limited flow must be transmitted only within the trusted network are, for instance: to avoid the decrease of security of outflow of the flow to outside the trusted network, or to evade the decline of QoS (Quality of Service), while there may be any other reason, and the present invention is not limited whatever the reasons may be.

The First Embodiment

Figure 1:
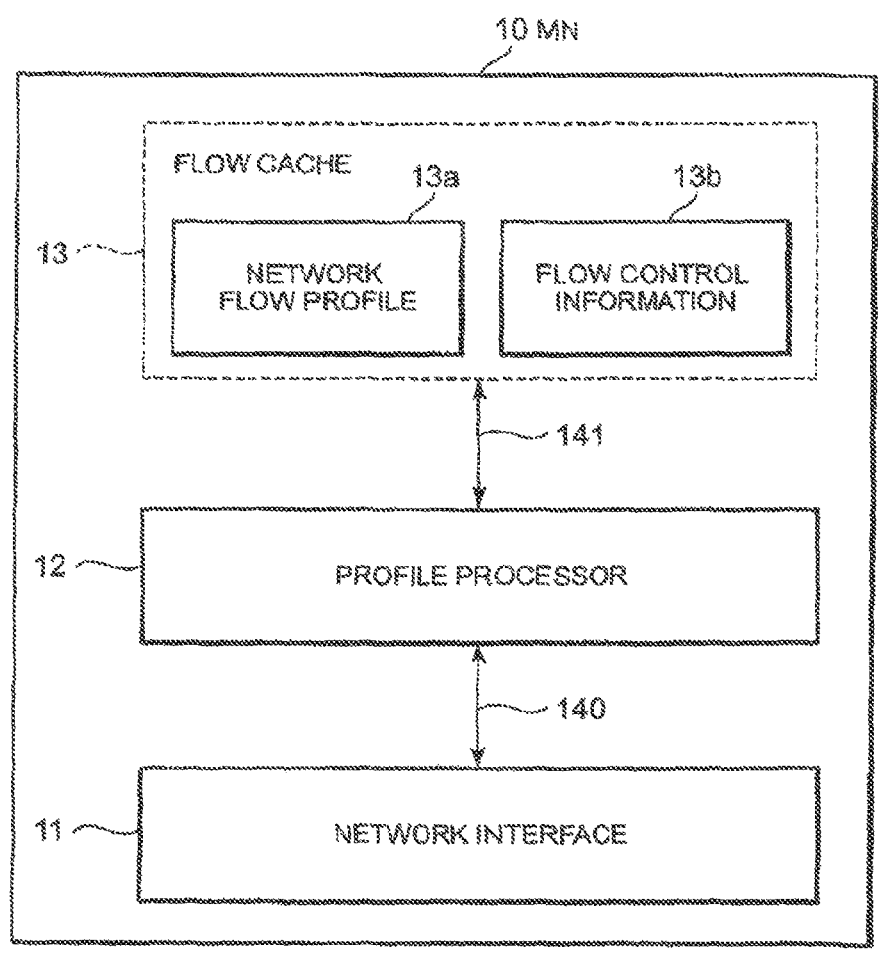
FIG. 1 is a block diagram to show an example of an arrangement of a mobile node in a first embodiment of the present invention.

First, description will be given on the first embodiment of the invention. FIG. 1 shows an example of an arrangement of a mobile node in the first embodiment of the invention. A mobile node (MN) 10 has one or more network interfaces 11, a profile processor 12, and a flow cache 13. A network flow profile 13a and flow control information 13b are stored in the flow cache 13.

The network interface 11 is a functional block that contains hardware and software necessary when the mobile node 10 performs communication to and from another node via an arbitrary communication medium. If the terms known in the related technical field are used, the network interface 11 represents communication component such as a layer 1 (physical layer) and a layer 2 (data-link layer), a firmware, a driver, a communication protocol, etc. In FIG. 1, only one network interface 11 is shown, while MN 10 may have a plurality of network interfaces 11.

Information relating to the transmission of trigger/packet is given and taken between the network interface 11 and the profile processor 12 via a signal/data path 140.

The profile processor 12 has the function to check and update the network flow profile 13a. When the profile processor 12 receives a trigger from the network interface 11, the checking function of the profile processor 12 comes into effect. As the trigger, there may be a case where one or more network interfaces 11 have changed the connection point or a case where aggravation of network status is detected, but it is not limited to these cases.

The checking function of the profile processor 12 is to decide whether the interface that changed connection, has forwarded the domain limited flow to outside of the trusted access network of the service provider or not (or, whether it falls under the status to forward the domain limited flow or not).

In case it is detected that the domain limited flow has been transmitted to outside of the trusted access network, the updating function of the profile processor 12 comes into effect, and the network flow profile 13a is updated. By this updating, the network flow profile 13a relating to the domain limited flow is updated, and it can be set so that the domain limited flow does not flow out from the trusted access network of the service provider.

Between the profile processor 12 and the flow cache 13, information relating to transmission of profile/information is given and taken via the signal/data path 141.

The flow cache 13 can store the information relating to the traffic flow. For instance, the network flow profile 13 can be stored in the flow cache 13. The network flow profile 13a is a filter rule to instruct a method to forward a traffic flow of the mobile node 10. The network flow profile 13a is defined by the service operator of the mobile node 10, and it is offered to the mobile node 10 from the network at an arbitrary timing. The network flow profile 13a may have one or more filter rules.

Further, the flow control information 13b as introduced in the present invention can be stored in the flow cache 13. As described above, when it is detected that the domain limited flow has been transmitted to outside of the trusted access network of the service provider, the network flow profile 13a is updated. The flow control information 13b contains a type of information that is needed when the network flow profile 13a is to be updated. An example of the flow control information 13b may be a trusted flow list 310 or a trusted access list 311 (as to be described later) offered from a home agent on the network side.

Figure 2:
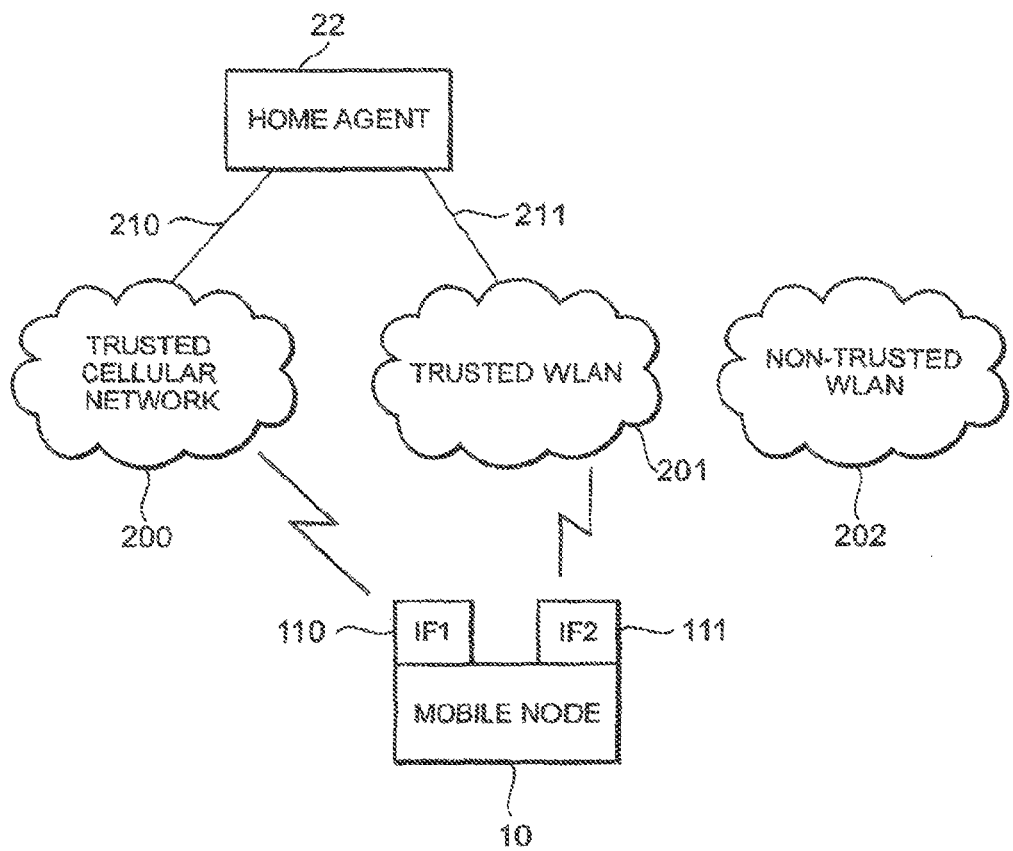
FIG. 2 is a schematic drawing to show an example of a network arrangement in the first embodiment of the invention.

FIG. 2 shows an example of a network arrangement in the first embodiment of the invention. In the network arrangement shown in FIG. 2, a home agent (HA) 22, a cellular network (trusted cellular network) 200, and a WLAN (trusted WLAN) 210 make up together a trusted network. This trusted network may be owned by a single service provider or may be owned by a plurality of providers that are in trust relation with each other.

HA 22 and the cellular network 200 are connected to each other via the signal/data path 210. Also, HA 22 and WLAN 201 are connected to each other via the signal/data path 211.

Further, in this network arrangement, there is a non-trusted WLAN 202 (a WLAN not belonging to the trusted network) formed by the cellular network 200 and the WLAN 201.

Also, as shown in FIG. 2, there is a mobile node (MN) 10 that owns two network interfaces, i.e., a cellular interface (IF 1) 110 and a WLAN interface (IF 2) 111. In the initial status, it is supposed that the cellular interface 110 and the WLAN interface 111 are connected to the cellular network 200 and WLAN 201 respectively. Therefore, the cellular interface 110 acquires CoA (cellular trusted CoA (Trusted-CoA-Cellular) from the cellular network 200 and acquired a WLAN trusted CoA (Trusted-CoA-WLAN) from the WLAN network 201.

It is supposed here that the cellular trusted CoA corresponds to a binding identifier (BID 1) and the WLAN trusted CoA corresponds to a binding identifier (BID 2). MN 10 registers a binding at HA 22—i.e., a binding, in which both the cellular trusted CoA added with BID 1 to HoA (home address) of MN 10 and the WLAN trusted CoA added with BID 2 are associated. Also, it is supposed that MN 10 and HA 22 have the domain limited flow that passes via BID 2. In the description as given below, it is assumed that the cellular interface 110 uses CoA, while the cellular interface 110 may acquire and use HoA (and not CoA) from the cellular network 200. In this case, location information that MN 10 registers at HA 22, indicates that two addresses, i.e., HoA and CoA (assigned to the WLAN interface 111) as transfer destinations, and BID 1 corresponds to the location information to indicate HoA.

According to the present invention, when the mobile node moves to the non-trusted network, the mobile node must update the network flow profile 13a so that the path of the domain limited flow can be maintained within the trusted network. Therefore, it is necessary that the mobile node not only receives and maintains the network flow profile but also must have "flow control information (FCI)" to update the route of the domain limited flow.

Figure 3A:
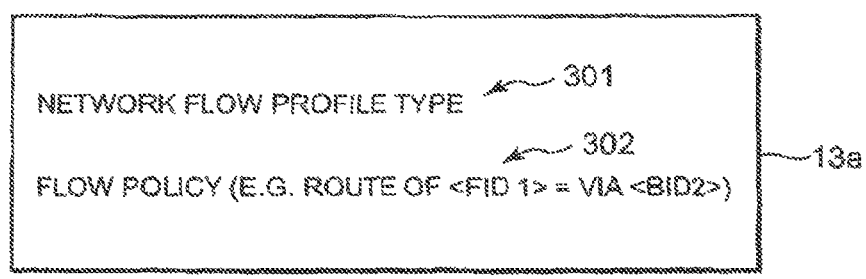
FIG. 3A is a schematic drawing to show general features of a network flow profile in the first embodiment of the invention.

Next, description will be given on format of the network flow profile 13a and the flow control information 13b. FIG. 3A schematically shows general features of the network flow profile in the first embodiment of the invention. The network flow profile 13a has a network flow profile type 301 and a flow policy 302.

The network flow profile type 301 indicates the intended purpose of the network flow profile. The intended purpose of the network flow profile 13a may include routing control of the domain limited flow or access control to the network, but it is not limited to these.

By the flow policy 302 that is present in the network flow profile 13a, HA 22 can define one or more policies to MN 10. The flow policy 302 may be a routing policy to be set by HA 22 for the purpose of instructing a method, by which MN 10 forwards the domain limited flow, or may be a list to indicate the network accessible by MN 10 (e.g., CSG (Closed Subscriber Group)), but it is not limited to these.

For instance, HA 22 sets a flow policy to instruct MN 10 to forward a data packet ((e.g., a data packet of "i mode" (registered trademark) of MN 10) that should be normally transmitted via the cellular network) via the WLAN trusted CoA (BID 2). It is assumed that this data packet has a flow identification information FID 1.

Figure 3B:
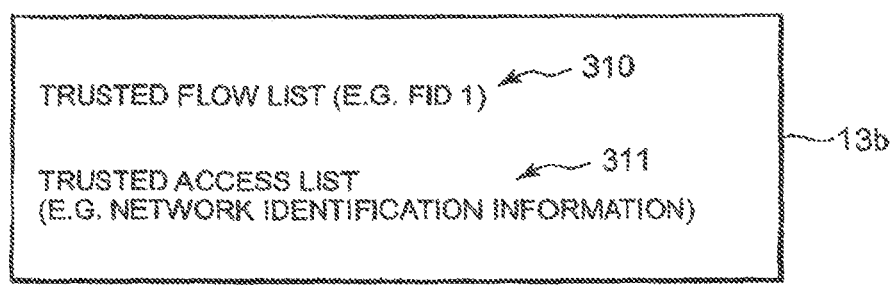
FIG. 3B is a drawing, schematically showing general features of flow control information in the first embodiment of the invention.

FIG. 3B schematically shows general features of flow control information in the first embodiment of the invention. The trusted flow list 310 and the trusted access list 311 are included in the flow control information 13b.

By the trusted flow list 310, HA 22 can instruct MN 10 as to which flow of MN 10 should be forwarded via the trusted access network. For instance, HA 22 adds an entry to the trusted flow list 310, i.e., an entry that notifies MN 10 that a data packet (FID 1) of "i mode" (registered trademark) can be transmitted only within the trusted access network. Here, FID (flow ID) is used as information to designate the flow, but any type of information may be used, by which it is possible to identify the communication performed by MN 10. For instance, these include: address of the correspondent, protocol number, session ID, connection ID, etc. In particular, when it is connected to 3GPP network, an ID to identify connection with PDN gateway (PDN connection ID, APN) is used, for instance.

Further, by the trusted access list 311, HA 22 can notify MN 10 as to which of the access networks is classified as the trusted network of the service operator. For instance, HA 22 describes network identification information (network ID) to specify the trusted access network of the service operator in the trusted access list 311. Specifically, by referring to the trusted access list 311, it is possible to specify the trusted network of the service provider.

The layout of the network flow profile 13a and the flow control information 13b may be generated by XML (eXtensible Markup Language) scheme. Also, other programming language such as JavaScript (registered trademark) may be used.

It is supposed here that MN 10 performs transmission and receiving of the domain limited flow by using the WLAN interface 111 connected to the WLAN 201. For instance, it is supposed that MN 10 requests "i mode" (registered trademark) service that is a domain limited flow, from the service provider. A data packet (FID 1) of "i mode" (registered trademark) must be forwarded only via the trusted network, and HA 22 sets the network flow profile 13a relating to MN 10 so that the data packet (FID 1) is transmitted via the WLAN trusted CoA (BID 2).

On the other hand, in case MN 10 is moving between networks that are different from each other, the WLAN interface 111 of MN 10 may be shifted from communication area of the WLAN (trusted WLAN) 201 to communication area of another WLAN (non-trusted WLAN) 202. By the change of the connection point at MN, a trigger is transmitted from the network interface 11 to the profile processor 12.

FIG. 4 is a flowchart to show an example of operation of the profile processor that receives a trigger to indicate the change of the connection point of the mobile node, in the first embodiment of the invention.

In FIG. 4, when the profile processor 12 receives the trigger from the network interface 11 (Step S40), the network flow profile 13a and the flow control information 13b are retrieved from the flow cache 13 relating to MN 10 (Step S41). In the trigger received, it is indicated which network interface 11 of MN 10 is moving (in the connection changeover operation).

Then, by using information acquired from the trigger or from information acquired from the cache 13, the profile processor 12 checks whether an active domain limited flow is present or not that relates to the interface in moving of MN 10 (Step S42).

In case an active domain limited flow relating to the interface in moving is not present, the profile processor 12 requests a mobile IP stack within MN 10 to carry out binding operation to HA 22 in relation to a new CoA (WLAN-non-trusted CoA) of MN 10, and a BU is generated (Step S47).

On the other hand, the domain limited flow is transmitted and received by using the WLAN interface 111 connected to the WLAN 201. In case the connection of the WLAN interface 111 is changed over from the WLAN (trusted WLAN) 201 to the WLAN (non-trusted WLAN) 202, the profile processor 12 detects the presence of the domain limited flow relating to the interface in moving of MN 10.

In this case, the profile processor 12 requests that network identification information (network ID) of the access network, to which the interface in moving from the network interface is connected (Step S43), should be provided. According to the network identification information of the access network, the profile processor 12 performs the processing to specify whether the interface in moving is still present within the trusted network of the service provider or not (Step S44).

As a method to specify whether the interface in moving is present or not within the trusted network of the service provider, there is a method to compare the network identification information of a new access network with information in the trusted access list 311, but it is not limited to this.

In case the interface in moving is still present within the trusted network of the service provider, the profile processor 12 requests the mobile IP stack within MN 10 to carry out binding operation to HA 22 in relation to a new CoA (a WLAN trusted CoA) of MN 10, and BU is generated (Step S47).

Also, in case MN 10 changes over the connection of the WLAN interface 111 from the WLAN (trusted WLAN) 201 to the WLAN (non-trusted WLAN) 202 as described above, the profile processor 12 detects that the WLAN interface 111 after the connection changeover is not present within the trusted network of the service provider. In this case, therefore, the profile processor 12 updates the network flow profile 13a of MN 10 by using the flow control information 13b (Step S45).

For instance, according to the trusted flow list 310 included in the flow control information 13b, the profile processor 12 comprehends that the data packet (FID 1) of "i mode" (registered trademark) associated with BID 2 must be forwarded via the trusted access network. Also, from the trusted access list 311 included in the flow control information 13b, the profile processor 12 confirms that the trusted access network as usable is a cellular network 200 using the cellular trusted CoA (BID 1). As a result, the profile processor 12 performs updating to change the route of FID 1 from a route via BID 2 to a route via BID 1 within the network flow profile 13a of MN 10.

When the updating of the network flow profile 13a of MN 10 is completed, the profile processor 12 requests the mobile IP stack within MN 10 to carry out the binding operation to HA 22 relating to a new CoA (a WLAN-non-trusted CoA) of MN 10, and a BU is generated (Step S46).

In this binding operation, the network flow profile 13a of MN 10 as updated is further placed into payload of the BU, and it is indicated by a BU flag that the network profile 13a of MN 10 has been changed according to the flow control information 13b of MN 10 as offered to HA 22.

In the BU generating processing in both of Step S46 and Step S47, the mobile IP stack within MN 10 transfers the BU to the network interface 11 and the BU is transmitted to HA 22 (Step S48).

In another embodiment, it may be so arranged that, in case it is decided that the interface in moving of MN 10 is still present in the trusted network of the service provider, the profile processor 12 requests the mobile IP stack in MN 10 to generate a BU relating to the binding operation to HA 22 so that an additional flag is added to the BU. This flag (B flag 53 as to be described later) is still present within the trusted network even when the domain limited flow relating to the interface in moving of MN 10 is present, and this indicates that HA 22 does not have to check as to whether it is necessary to re-set the route of the domain limited flow or not. By this method, it is possible to alleviate the processing by HA 22 on the network flow profile 13a and the flow control information 13b relating to MN 10 when the interface of MN 10 moves within the trusted access network.

Figure 5:
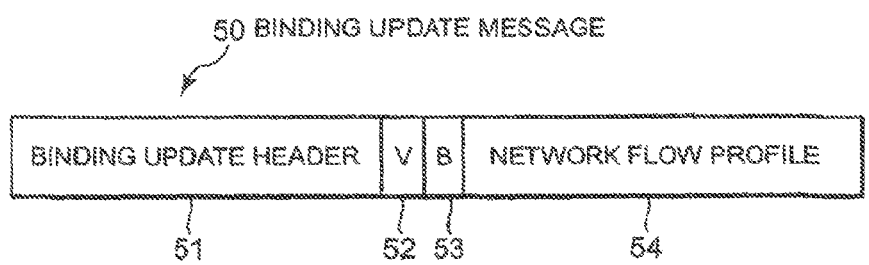
FIG. 5 is a drawing to show an example of format of a binding update message in the first embodiment of the invention.

FIG. 5 shows an example of format of a binding update message in the first embodiment of the invention. The binding update message as shown in FIG. 5 has a binding update header 51, a V flag 52, a B flag 53, and a network flow profile region 54.

In the binding update header 51, information necessary for notifying a new care-of address to the other node by the mobile node is included. The V flag 52 is to notify to HA 22 that the network flow profile 13a of MN 10 has been changed according to the flow control information 13b of MN 10. Further, by the B flag 53, HA 22 can comprehend that there is no need to carry out re-routing of the domain limited flow because MN 10 is moving within the trusted network.

In the network flow profile region 54, the updated network flow profile 13a of MN 10 is included. The V flag 52 and the B flag 53 may be located at any location, and these may be realized as a flag within the binding update header 51 or may be realized as a flag within a region to notify the network flow profile 54. The network flow profile region 54 may be disposed at any location as desired, and it may be realized as an operation of an arbitrary header, or it may be realized by payload. By referring to the updated network flow profile 13a included in the network flow profile region 54, HA 22 can verify whether the change by MN 10 is correct or not.

When a BU 50 is received from MN 10, HA 22 decides necessary operation to be executed through the processing of the BU 50. For instance, HA 22 recognizes that the updated network flow profile 13a of MN 10 is stored in the network flow profile region 54. In this case, HA 22 verifies whether MN 10 has correctly updated the network flow profile 13a or not. As the method of verification by HA 22, there is a method to confirm that all domain limited flows are transmitted within the trusted access network by referring to the network flow profile 13a, but it is not limited to this.

When the verification relating to the updating of the network flow profile 13a by MN 10 has been completed, HA 22 replaces the network flow profile 13a relating to MN 10 as stored in HA 22 itself by a network flow profile of MN 10 as forwarded through the updating of the BU 50 (i.e., the network flow profile 13a as included within the network flow profile region 54).

There may be a case where the V flag 52 is not set in the BU 50 received by HA 22 and the network flow profile 13a of MN 10 as updated may be included in the network flow profile region 54. In such case, it is decided that MN 10 has changed the network flow profile 13a without referring to the flow control information 13b, and it is desirable that HA 22 rejects the BU 50.

Also, the B flag 53 may be set in the BU 50 received by HA 22. Because the B flag 53 is set, HA 22 can immediately comprehend that MN 10 has moved in the trusted network and there is no need to change the network flow profile 13a.

According to the present invention, the flow control information 13b of MN 10 is updated by HA 22 in case MN 10 changes the connection point, or in case MN 10 requests a new domain limited service, or in case MN 10 has completed the domain limited service. Here, HA 22 updates adequate entry included in the flow control information such as the trusted flow list 310 of the domain limited flow or the trusted access list 311 of the trusted network.

If HA 22 comprehends that MN 10 is moving with the trusted access network, it is possible to select so that the updated flow control information 13b may not be transmitted to MN 10. Because the basic rules of the service provider are to ensure that the domain limited flow can be transmitted only within the trusted network, MN 10 moving within the trusted access network does not behave against the rules. By this selective behavior, when HA 22 has many subscribers using the domain limited service, the network resources of HA 22 can be more efficiently used.

Also, by using the group identification information, it is possible to identify a plurality of domain limited flows of the mobile node. For instance, MN 10 is subscribed in three domain limited services that have different types of flow identification information, i.e., FID 1, FID 2 and FID 3, and these three domain limited flows are supposed to be transmitted via the same BID of MN 10.

HA 22 can classify these three domain limited flows according to group identification information called trusted group identification (TGID) information (reliable group identification). Then, HA 22 adds TGID to the network flow profile 13a and the flow control information 13b to be used by MN 10.

By using TGID, MN 10 can update all related domain limited flows (domain limited flows belonging to the same TGID) by simply transmitting one BU, and an overhead due to the BU can be alleviated. Also, MN 10 and HA 22 can make arrangement as to which of a plurality of TGIDs various types of the domain limited flows should be classified. In so doing, MN 10 can flexibly decide the method to classify the domain limited flows.

As described above, according to the first embodiment of the invention, the mobile node can recognize the domain limited flows and the trusted network, and the mobile node itself can perform control so that the domain limited flows can be transmitted and received only within the trusted network. As a result, it is possible to select the network suitable for a specific flow, to change and notify the network flow profile, and to accomplish efficient flow transfer by the mobile node.

The Second Embodiment

Figure 6:
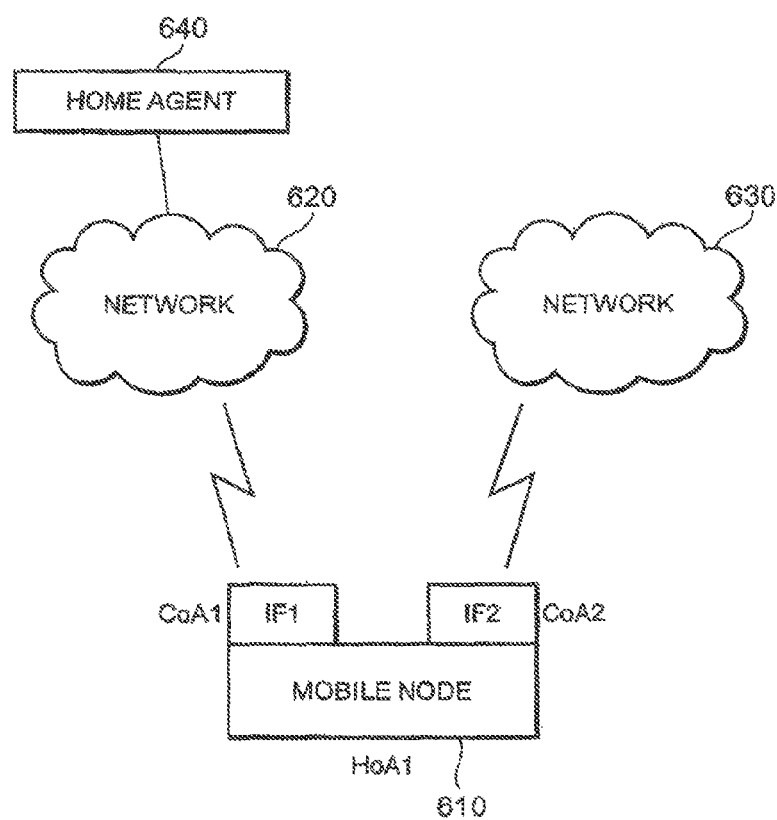
FIG. 6 is a schematic drawing to show an example of a network arrangement in a second embodiment of the invention.

Next, description will be given on the second embodiment of the invention. FIG. 6 is a schematic drawing to show an example of a network arrangement in the second embodiment of the invention. In FIG. 6, MN 610 has two interfaces, i.e., IF 1 and IF 2. IF 1 is connected to a network 620, and IF 2 is connected to a network 630. IF 1 and IF 2 can change the network to be connected according to the moving of MN 610, and mobile management is controlled by a mobile IP using HA 640.

Figure 7:
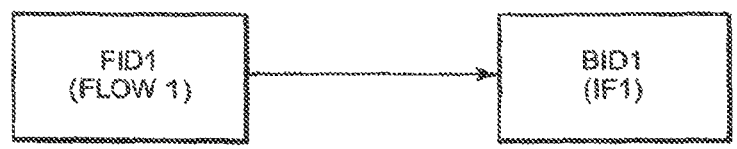
FIG. 7 is a block diagram to show an example of an arrangement of a mobile node in the second embodiment of the invention.

To MN 610, flow information is given from HA 640. In the flow information, an interface to be used for transmission and receiving is specified to the flows that are given and taken between MN 610 and the correspondent. For instance, when flow information notified from HA 640 is present on a flow that MN 610 is going to transmit, MN 610 transmits a packet by using the interface as specified by this flow information. According to the second embodiment of the invention, as shown in FIG. 7, it is assumed that MN 610 has acquired flow information to specify the use of BID 1 (IF 1) to FID 1 (flow 1) (i.e., flow information corresponding to the network flow profile 13a in the first embodiment of the invention). Here, FID (flow ID) is used as information to specify the flow, while any type of information may be used, which can identify the communication performed by MN 610. For instance, these types of information may include: address of the correspondent, protocol number, session ID, connection ID, etc. In particular, when it is connected to the 3GPP network, an ID to identify the connection with the PDN gateway (PDN connection ID, APN) or the like is used.

Figure 8:
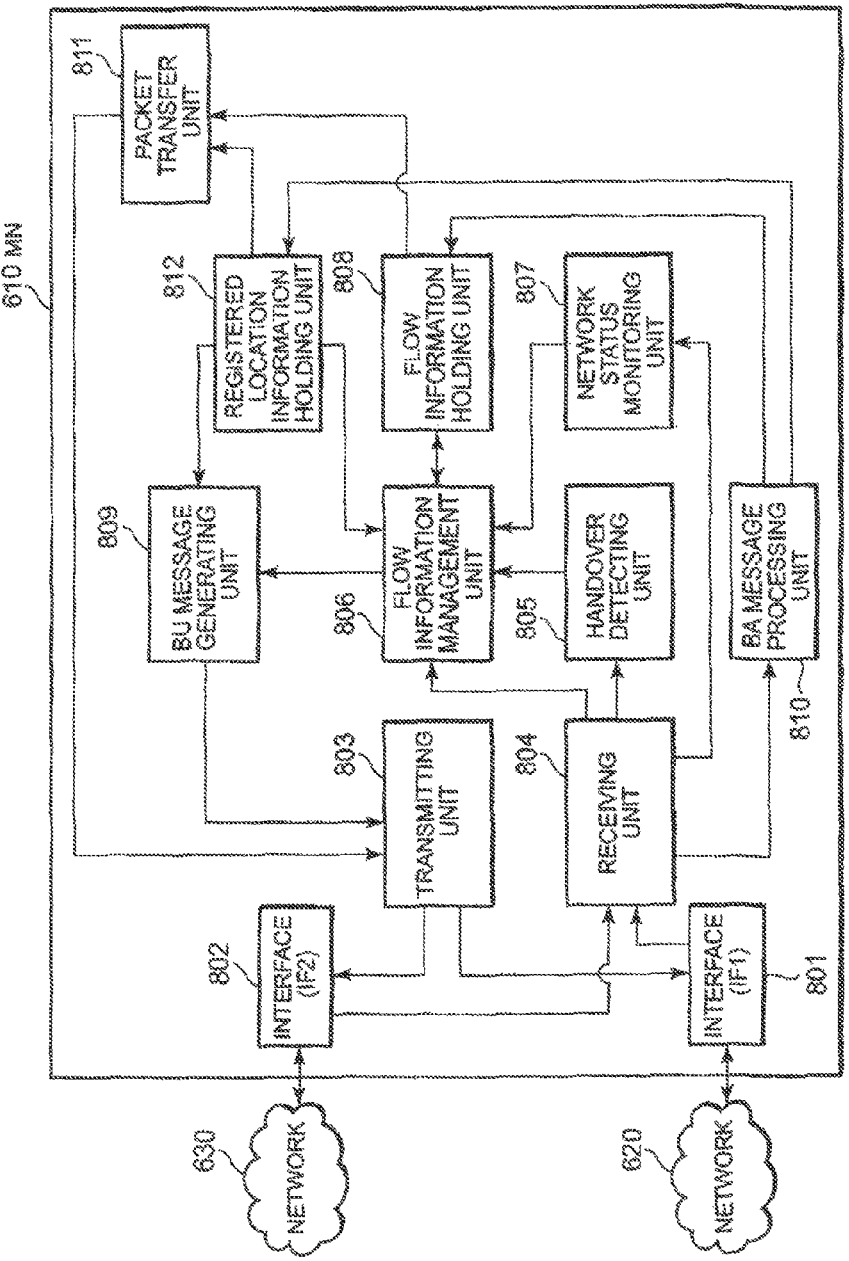
FIG. 8 is a block diagram to show an example of an arrangement of a mobile node in the second embodiment of the invention.

FIG. 8 shows an example of an arrangement of a mobile node in the second embodiment of the invention. MN 610 as shown in FIG. 8 has two interfaces 801 and 802, a transmitting unit 803, a receiving unit 804, a handover detecting unit 805, a flow information management unit 806, a network status monitoring unit 807, a flow information holding unit 808, a BU message generating unit 809, a BA message processing unit 810, a packet transfer unit 811, and a registered location information holding unit 812.

The presence of the interfaces 801 and 802 indicates that MN 610 has two interfaces. The two interfaces 801 and 802 correspond to two interfaces of IF 1 and IF 2 in FIG. 6 respectively. The transmitting unit 803 and the receiving unit 804 have the functions to transmit and receive packets via the interfaces 801 and 802 respectively.

The handover detecting unit 805 has the functions to predict that the handover may be carried out at the interface 801 or the interface 802 or to detect generation of handover, and to notify the information relating to the interface concerned to the flow information management unit 806.

The flow information management unit 806 has the function to decide, by referring to the information in the flow information holding unit 808, as to whether there is a flow or not, in which the use of the interface concerned is specified or not, and further, as to whether the flow is to be transmitted and received via another interface when notification is received from the handover detecting unit 805 or from the network status monitoring unit 807, as to whether the interface 801 or the interface 802 is going to perform the handover, and notification on status where the handover is actually carried out, and further, that the status of the network is being aggravated.

For instance, in case the detection of the handover relating to the interface 801 has been notified from the handover detecting unit 805, the flow information management unit 806 identifies that a flow is present, which is specified to use the interface 801, and decides that it should be confirmed as to whether another interface (interface 802) different from the interface 801 as specified to this flow can be used or not. Then, the flow information management unit 806 instructs the BU message generating unit 809 to generate a flow confirmation message and to transmit it via the interface 802. In the flow confirmation message, information to specify the flow (e.g., flow ID) and information to specify the interface (BID) are placed. For instance, a message for flow confirmation is generated, which is to confirm whether IF 2 (BID 2) can be used or not for transmission and receiving of the flow 1. Even in case there is no interface specified to the flow, it may be decided that it should be confirmed as to whether another interface can be used for the flow or not. As the information to be included in the message for flow confirmation, the information to identify the network, to which the interface is connected, may be included instead of the information to specify the interface (BID). For instance, a prefix or an address used in the network, or access technique type, access network identifier (e.g., SSID of WLAN), etc., may be used.

In case the handover relating to the interface 801 is detected prior to the starting of actual handover processing, i.e., it is detected that the interface 801 is very likely to start the handover (link going down), the interface 801 in connecting state may be used as the interface to be used for the transmission of the message for flow confirmation. In case it is detected that the interface 801 in non-connecting state is very likely to be connected to the network (link going up), the interface 802 in connecting state may be used. Or, the message for flow confirmation may be transmitted immediately after the completion of the handover by the interface 801.

The network status monitoring unit 807 has the function to monitor the network status and to notify the information on the interface influenced by aggravation of network status to the flow information management unit 806 when it is predicted or detected that the network status is being aggravated. By the network status monitoring unit 807, it is possible to reset the flow route by the network status monitoring unit 807—not only at the time of handover of the interface but also when the network status is aggravated. For instance, the network status monitoring unit 807 may decide that transmission and receiving of the flow should be changed over to another interface (i.e., handover and/or moving of the flow should be carried out) when it is decided that the load of the interface in use or the load of the network connected is too high, or communication quality suitable for the flow cannot be maintained (due to delay, or generation of jitter), and further, that conditions such as high cost for communication cannot be met. Or, even when it is changed from the state where only IF 1 is connected to a state where both IF 1 and IF 2 are connected and it is decided that IF 2 is regarded as more suitable than IF 1, it may be decided that the flow, for which communication has been performed by using IF 1, should be changed to IF 2.

The flow information holding unit 808 has the function to maintain information to specify the use of a specific interface to a certain flow, or information to indicate whether or not the flow can be transmitted or received via the other interface or not (or information to specify the other interface that can transmit and receive the flow). The information in the flow information holding unit 808 is referred when the message for flow confirmation is generated by the flow information management unit 806.

The BU message generating unit 809 receives an instruction of the flow information management unit 806 and generates a BU message including the delivered flow ID and BID. This BU message has an intended purpose as a message for flow confirmation to confirm to the home agent as to whether the flow ID included in the BU message can be transmitted or received by an interface, to which BID included in the BU message is assigned.

The BA message processing unit 810 has the function to perform the processing relating to a BA message received from HA (message for flow confirmation) as a response to the transmitted BU message (message for flow confirmation response) and to instruct the flow information holding unit 808 to hold the notified flow information. In the flow information notified from HA, the information to indicate whether a certain flow can be transmitted or received via the other interface or not as specified in the existing flow information (i.e., whether or not the flow ID is included in the BU message can be transmitted or received via an interface, to which BID included in the BU message is assigned).

The packet transfer unit 811 has the function to control packet transfer and can specify the interface to be used for transmission of a certain flow. When it is notified in the message for flow confirmation response that a certain flow can be transmitted and received via another interface, the packet transfer unit 811 refers to a new flow information which is the result of confirmation by the message for flow confirmation, and selects another interface as the interface to be used for transmission of the flow (i.e., the interface allowed by the flow information), and transfers the packet.

The registered location information holding unit 812 has the function to maintain the information relating to the binding with CoA (or BID) and HoA, or information relating to the node where the binding is registered.

Figure 12:
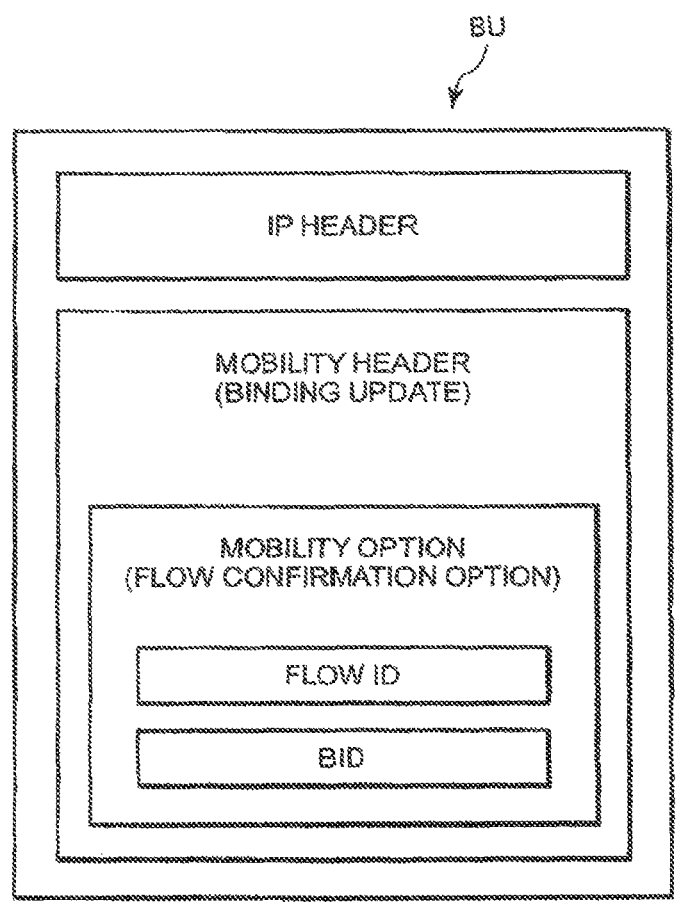
FIG. 12 is a drawing to show an example of format of a flow confirmation message using a binding update message in the second embodiment of the invention.

FIG. 12 shows an example of format of the message for flow confirmation using a binding update message in the second embodiment of the invention. As shown in FIG. 12, the message for flow confirmation can be realized by mobility option (flow confirmation option) in the mobility header. Flow ID and BID are placed in the flow confirmation option.

The message for flow confirmation can be realized by an arbitrary method and in an arbitrary format. For instance, the message for flow confirmation may be realized by using a flow ID option used when MN notifies the flow information to HA. Also, as the message for flow confirmation, a message may be used, by which HA notifies flow information to specify CoA to be used as transfer destination (i.e., a message to notify the flow information to HA from MN) instead of a BU message when MN registers a plurality of CoA's to HA, or a special-purpose message for flow confirmation different from other message or network information requesting message to information server may be used.

Figure 10:
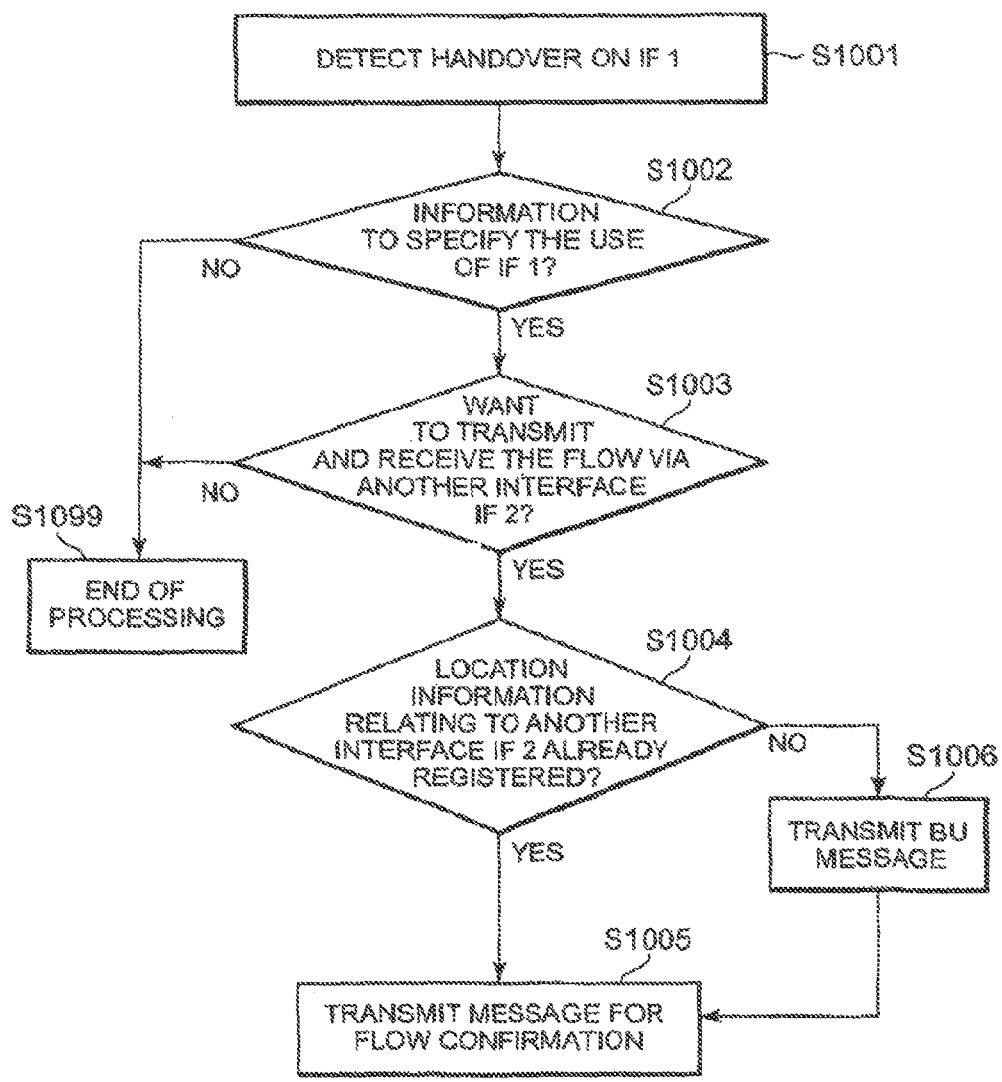
FIG. 10 is a flowchart to show an example of judgment processing of a mobile node when connection changeover in its own interface is detected in the second embodiment of the invention.

FIG. 10 shows an example of judgment processing of MN when connection changeover (handover) is detected at its own interface in the second embodiment of the invention.

In FIG. 10, when the handover on the interface (IF 1) of MN is detected at the handover detecting unit 805 (Step S1001), it is confirmed whether there is a flow or not, for which the use of IF 1 is specified (Step S1002), and if such flow information is present, it is further confirmed whether or not it is a flow where it is wanted to suppress the influence from packet loss, delay or jitter as much as possible, i.e., whether transmission and receiving of the flow should be changed over to another interface (IF 2) or not (Step S1003).

As a result, if judgment is made that transmission and receiving should be changed to another interface (IF 2), it is confirmed whether the location information relating to said another interface (IF 2) is already registered at HA or not (Step S1004). If the location information is already registered, a message for flow confirmation is transmitted to confirm whether or not it is a flow that can be transmitted or received by using another interface (IF 2) (Step S1005). If the location information is not yet registered, a BU message to register the location information is transmitted (Step S1006), and the message for flow confirmation is transmitted (Step S1005). The message for flow confirmation to be transmitted in Step S1005 and the BU message to be transmitted in Step S1006 may be put together, and these may be transmitted as a single BU message.

In case it is decided in Step S1002 that a flow where the use of IF 1 is specified is not present, or in case it is decided in Step S1003 that it should not be changed over to another interface (IF 2), the processing is completed without performing a specific processing (Step S1099).

To each of the flow information as held at the flow information holding unit 808, flow type may be added and placed under management. In this case, the flow information is maintained in the flow information holding unit 808, and flow type of each flow information can be held.

This flow type is a type of information in which HA is set in the flow information to be transmitted to MN. For instance, there are two types. In the first type, a flow is associated with the network where the interface is connected. Specifically, in the first type, when the handover is performed and the connected network has been changed over, the flow specified in the flow information is a flow that may not be transmitted or received by the network after the connection changeover. The flow of this first type has the possibility that the flow information may be changed due to the change of CoA. Hereinafter, this is referred to as "CoA-bind flow".

On the other hand, in the second type, the flow is associated with the interface. Specifically, the flow of the second type is a flow, in which the specified interface cannot be changed even when the connected network is changed over by the handover. The flow of the second type is the flow information that can be used as it is even when CoA is changed. Hereinafter, this is referred to as "BID-bind flow".

This difference of the flow type can be expressed by setting a flag (a flow type flag) to each type of flow information in the flow information notifying message to be transmitted from HA to MN. For instance, when a flow type flag is set, it can be decided as a CoA-bind flow. When the flow type flag is not set, it is decided as a BID-bind flow.

When a notification that a change has occurred in the status of the interface is received from the handover detecting unit 805 or from the network status monitoring unit 807, the flow information management unit 806 confirms the presence of the flow information, in which the use of the interface is specified. If such flow information is present, the flow information management unit 806 confirms the flow type flag of the flow information.

When the flow type flag of the flow information is set (i.e., the case of the CoA-bind flow), it is found that there is possibility that this flow cannot be transmitted and received, depending on the network to be connected. Then, in the stage prior to the completion of the handover in the state where the handover is very likely to take place not only for suppressing the influence by the cause such as packet loss during the handover but also for preventing the impossibility to transmit and receive the packet after the handover, it can be decided that MN can change over the interface to be used for this flow.

On the other hand, in case the flow type flag of this flow information is not set (i.e., the case of the BID-bind flow), it is found that this flow is a flow that is to be transmitted and received by using the interface without depending on the connected network. As a result, MN can decide that there is no need to change over the interface to be used to this flow.

Figure 11:
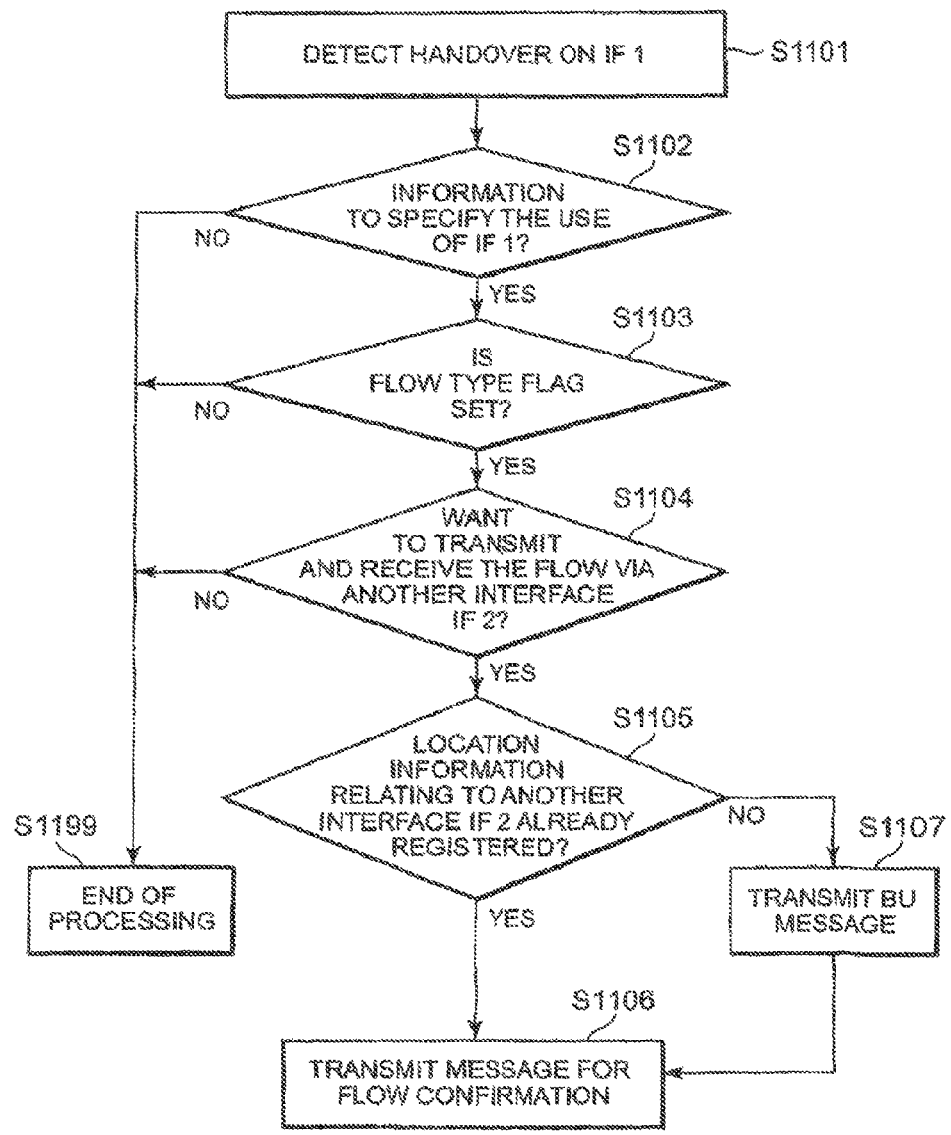
FIG. 11 is a flowchart to show an example of judgment processing of a mobile node when a flow type flag added to the flow information is confirmed in the second embodiment of the invention.

FIG. 11 is a flowchart to show an example of judgment processing of MN when the flow type flag added to the flow information is confirmed in the second embodiment of the invention.

In FIG. 11, in case the handover is detected at the interface (IF 1) of MN at the handover detecting unit 805 (Step S1101), it is confirmed whether there is a flow or not where the use of IF 1 is specified (Step S1102). If such flow information is present, it is confirmed whether the flow type flag of this flow is set or not (whether it is the CoA-bind flow or not) (Step S1103). If it is the CoA-bind flow, it is further decided as to whether it is a flow or not, for which the influences from packet loss, delay or jitter should be suppressed as much as possible, i.e., whether transmission and receiving of this flow should be changed over to the other interface (IF 2) or not (Step S1104).

As a result, if it is decided that the flow should be transmitted and received via the other interface (IF 2), it is confirmed whether the location information relating to the other interface (IF 2) is already registered at HA or not (Step S1105). In case the location information is already registered, a message is transmitted for flow confirmation to confirm as to whether it can be transmitted and received via the other interface (IF 2) (Step S1106). In case the location information is not registered, a BU message to register the location information is transmitted (Step S1107), and the message for flow confirmation is transmitted (Step S1106). The message for flow confirmation to be transmitted in Step S1106 and the BU message to be transmitted in Step S1107 may be put together and may be sent as a single BU message.

In case it is decided in Step S1102 that there is no flow where the use of IF 1 is specified, or in case the flow flag type is the BID-bind flow in Step S1103, or in case it is decided in Step S1104 that it should not be changed over to the other interface (IF 2), the processing is terminated without performing specific processing (Step S1199).

In case the flow information where a plurality of BID's are associated with one flow (e.g., BID 1 and BID 2 are associated with the flow 1) is notified from HA, and if MN decides that the flow 1, in which transmission and receiving are performed by using IF 1 as indicated by BID 1, should be changed over to the other IF due to the reason such as the handover, MN can decide that IF 2 as indicated by BID 2 can be used as the interface of the changeover destination.

In this case, if the connecting status or network status of IF 2 as indicated by BID 2 is frequently changed, or in case some change occurs to BID 2 as the second IF even when BID 2 is added as the second IF, HA must notify MN each time. For this reason, if such status occurs, MN transmits a message for flow confirmation when it is necessary to know the presence of the second IF—and not receiving the notification from HA, and it is possible to change over the operation to confirm whether IF 2 can be used or not as the interface for transmission and receiving of the flow 1. In this changeover of the operation, the suspension of notification of the flow information may be requested to HA based on the judgment on HA side, and the transmission of the message for flow confirmation is necessary from the side of MN 610 to MN 610 based on the judgment of HA.

Figure 9:
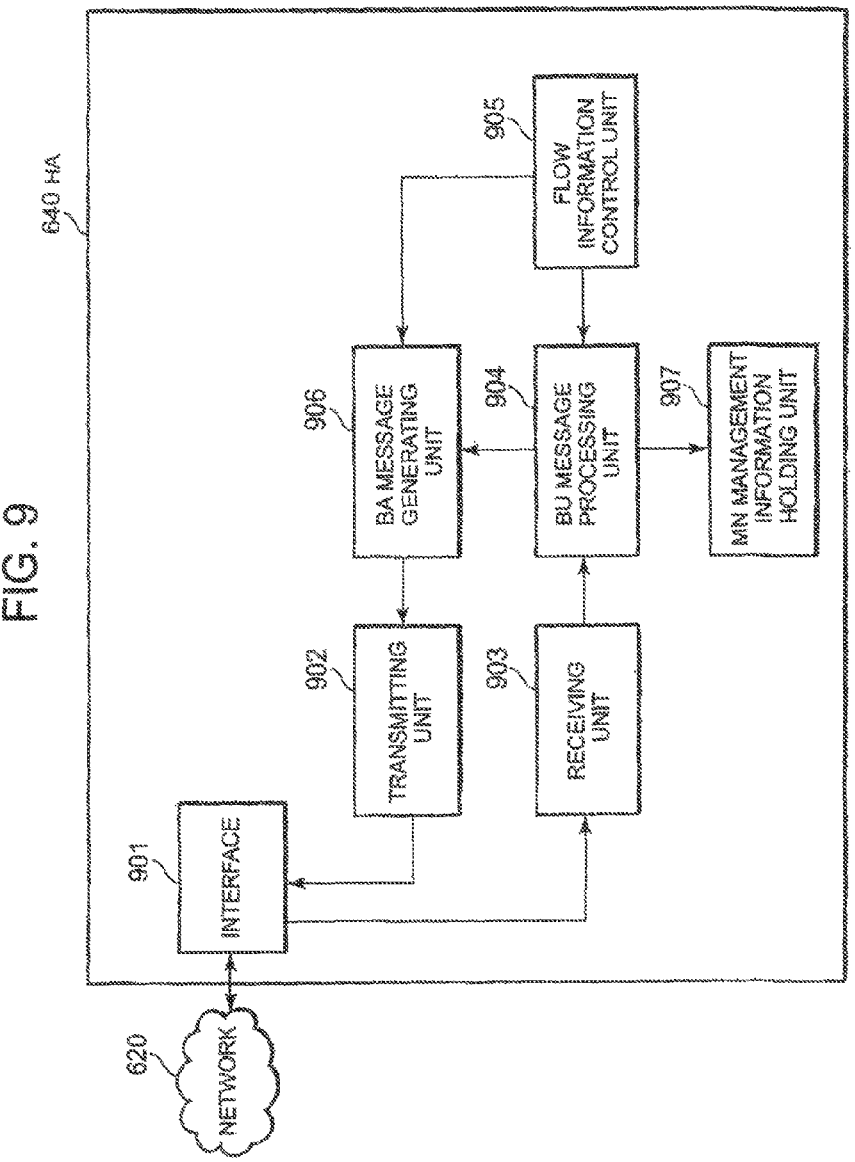
FIG. 9 is a block diagram to show an example of an arrangement of a home agent in the second embodiment of the invention.

FIG. 9 shows an example of an arrangement of a home agent in the second embodiment of the invention. HA 640 shown in FIG. 9 has an interface 901, a transmitting unit 902, a receiving unit 903, a BU message processing unit 904, a flow information control unit 905, a BA message generating unit 906, and a MN management information holding unit 907.

The interface 901 is an interface owned by HA 640. The transmitting unit 902 and the receiving unit 903 have the functions to transmit and receive the packets via the interface 901.

The BU message processing unit 904 has the function to perform processing of a BU message, which plays a role as a message for flow confirmation and received from MN. For instance, in case the BU message received from MN has a role as a message for flow confirmation, the BU message processing unit 904 delivers a flow ID and a BID included in the BU message to the flow information control unit 905 and instructs to decide whether it is possible or not to transmit and receive the flow indicated by the flow ID via the interface of MN as indicated by the BID.

The flow information control unit 905 has the function to carry out control relating to the flow information to be notified to MN under the management of HA, and to decide whether it is possible or not to transmit and receive the flow indicated by the flow ID via the interface instructed by the BID according to the flow ID and the BID as notified from MN.

When it is decided that the flow indicated by the flow ID can be transmitted and received via the interface indicated by the BID, the flow information control unit 905 instructs a BA message generating unit 906 to generate a BA message including the information to indicate that it can be transmitted and received. On the other hand, if it is decided that transmission and receiving are not possible, the flow information control unit 905 instructs the BA message generating unit 906 to generate the BA message including the information to indicate that transmission and receiving are not allowed.

When it is decided that transmission and receiving are not allowable via the interface indicated by the BID as notified from MN, and if transmission and receiving are allowable via the other interface of MN (e.g., via a third interface other than IF 1 or IF 2), for the purpose of notifying MN that the interface can be used, an instruction may be given in a BA message to include a BID to indicate the interface.

The judgment as to whether a certain flow can be transmitted or received via the interface as indicated from the BID or not can be made by referring to the location information on MN 610 maintained by the management information holding unit 907, and by identifying the network connected from the prefix of CoA of MN, to which the BID is associated, and further, by checking whether the transmission and receiving of the flow notified on the network are allowable or not.

Even when the BU message from MN 610 (i.e., a message for flow confirmation) is not received, the flow information control unit 905 can instruct the BA message generating unit 906 to generate a flow information notifying message to notify the changed flow information to MN.

The BA message generating unit 906 has the function to generate a BA message (a flow confirmation response message) including the information to indicate whether it is possible or not to transmit and receive the flow indicated by a certain flow ID via the interface as indicated by a certain BID according to an instruction from the flow information control unit 905.

The BU message processing unit 904 and the BA message generating unit 906 have also the functions to perform processing of the BU message relating to a normal mobile IP received from MN or to generate the BA message. By keeping the location information of MN under the management of the MN management information holding unit 907, the home agent functions can be accomplished.

As described above, according to the second embodiment of the invention, with regard to the flow 1, which has been transmitting and receiving the packet via IF 1 based on the flow information as notified from the home agent, it is decided whether or not the flow 1 should be transmitted and received via IF 2 when IF 1 of the mobile node carries out the handover and after confirming whether the flow can be transmitted or not via the network where IF 2 is connected, IF to be used can be changed over. As a result, it is possible to reduce and alleviate the influence of packet loss, delay, or jitter that occurs during the handover when IF 1 carries out the handover. Also, the mobile node can discriminate the flow where flow information may be changed due to the change of CoA (i.e., CoA-bind flow) and a flow that can be used even when CoA is changed (BID-bind flow). Then, it is possible to select the flow that is influenced by the change of CoA (CoA-bind flow) as an object of flow re-arrangement. The function of HA 640 to hold the location information of MN 610 in the second embodiment of the invention may be accomplished by an information server that is present on the network.

The Third Embodiment

Description will be given now on the third embodiment of the invention. Major difference between the third embodiment and the second embodiment of the invention is as follows: In the second embodiment, a method is adopted to confirm whether it is possible or not to use a network that is known to MN 610, for the transmission and the receiving of a certain flow. On the other hand, in the third embodiment, MN 610 notifies only the flow information and uses a method, according to which the information relating to the network as usable for the flow is acquired. In the third embodiment, as the information relating to the flow, any arbitrary information, which can identify the communication performed by MN 610, can be used. These types of information include, for instance: flow ID, address of the correspondent, protocol number, session ID, connection ID, etc. In particular, when it is connected to 3GPP network, ID to identify the connection with PDN gateway (PDN connection ID, APN) can be used.

In the third embodiment of the present invention, MN 610 is connected to a network via one or more interfaces, and MN 610 transmits and receives by itself. Or, the information relating to the flow to start transmission and receiving is transmitted to a network information management server (HA 640 or an information server on the network), and the information effective for the selection of the network suitable for transmission and receiving of the flow is requested (access network information). Here, the message to perform this request is referred to as an access network information requesting message. MN 610 transmits the access network information requesting message under the same judgment criteria as the handover detecting unit 805 and the network status monitoring unit 807 in the second embodiment of the invention.

For instance, when it is decided that the load of interface in use by a certain flow or the load of the connected network is too high, MN 610 decides that an arbitrary flow using this interface should be moved to the other network, and transmits the access network information requesting message including the information relating to this flow to the network information management server. Upon receipt of the message, the network information management server selects a network suitable for transmission and receiving of the notified flow, and transmits the information relating to this network to MN 610. On the other hand, MN 610 performs handover to the other network or changes over the flow to the interface connected to the other network.

Here, if it is assumed that MN 610 can be connected or it is being connected to a certain 3GPP network, and when it is decided that the flow under communication via this connection should be moved to the other network, the information on the other network usable by 3GPP interface is included in the information that can be acquired from the access network information. When it is decided that the flow on the 3GPP network side should be moved to the other network when MN 610 can be connected to both of the 3GPP network and the non-3GPP network, the access network information acquired may include the information on the network that can be used by the non-3GPP network. On the contrary, in case it is decided that the flow on the non-3GPP network side should be moved to the other network, the acquired access network information may include the information on the network that can be used by the 3GPP network.

As another example, when MN 610 acquires access network information relating to a certain flow at an arbitrary timing in advance and the transmission and receiving of the flow is started, or when the load of the interface that is transmitting and receiving this flow, is increased, MN 610 may use the access network information already acquired. For instance, the access network information relating to a specific flow may be acquired immediately after the completion of access authentication is completed and communication can be performed, or the access network information relating to the flow may be acquired after the communication of a certain flow is started from the correspondent.

In the two examples as given above, it is assumed that information of the network actually connectable is acquired at the moment when the access network information is requested, while it may be assumed that it is the information effective for selection of network/interface even when there may be change in the network environment thereafter, depending on the access network information acquired as to be described below.

As the access network information to be acquired, there are, for instance, an access technology type or the access network information, for which transmission and receiving of the notified flow is allowed. Also, there are, for instance, access technology type information most suitable for the notified flow, or information of a plurality of access technology types arranged in the sequence of priority. Further, there are, for instance, information on the most adequate access network to the notified flow or information on a plurality of access networks arranged according to the sequence of priority. Cellular network, WiMAX network, WLAN network, CSG cell, etc., are included in the access network.

As the access network information requesting message, any arbitrary message may be used. For instance, a message to notify the flow information for specifying CoA, which is used by HA as transfer destination (i.e., a message to notify the flow information from MN to HA) when the BU message of the mobile IP or MN registers a plurality of CoA's to HA may be used, or a network information requesting message to the information server may be used as a dedicated message. Further, a request message and a response message to be used by ANDSF (Access Network Discovery and Selection Function) may be used.

As described above, according to the third embodiment of the invention, MN 610 can use an adequate network as a network for transmitting and receiving the flow by acquiring a network suitable for the flow by notifying information relating to any arbitrary flow to the access network information management server, and it is possible to prevent the transmission of the flow to an inadequate network.

It is also possible to use by combining operation and arrangement as described in the first to the third embodiments of the invention as described above. For instance, in the first embodiment, MN receives and maintains flow control information from HA and checks whether rearrangement of the flow is necessary or not or performs flow change operation by referring to this information as necessary, while it is also possible to control so that the domain limited flow is transmitted within the trusted network by successively making inquiries to HA. Also, in the first embodiment, for instance, the information to indicate whether the flow is a CoA-bind flow or not, may be offered via an RA message as the flow control information. In the present specification, description is given on a case where a certain interface of MN is connected to the other network by handover, while this can be applied on a case where an interface in non-connecting status is connected to a network. Further, as a combination of the second embodiment with the third embodiment of the invention, MN transmits the information transmitted and received by itself or the information relating to the flow to be transmitted and received to the network information management server together with the information relating to the network that is detected by itself and can be connected, and MN may request that a network suitable for transmitting and receiving the notified flow should be selected from among these networks.

In the present specification, figures and descriptions are shown and described by giving consideration so that the present invention will be the most practical and preferred embodiment while those skilled in the art would obviously understand that various changes and modifications can be made without departing from the spirit and the scope of the invention on detailed designs and parameters relating to component elements of each node as described above.

For instance, the parameters as described in the network flow profile 13a and the flow control information 13b are not necessarily limited to those described in the specification. The requirements on the flow or network characteristics may be recorded in the network flow profile 13a and the flow control information 13b.

In the embodiments as described above, the network where the network in question and the network where the interface is connected are specified by using BID, while an ID to indicate CoA or connection destination network may be used instead of BID. Also, the information server to manage and hold the flow information, or AAA server, or the correspondent may have the function that HA has.

Further, in the embodiments as given above, MN 10 notifies to HA 22 that the network flow profile 13a is updated by referring to the flow control information 13b and by using a flag (V flag 52) in the BU, while nonce, secret number, cookie, etc., may be used instead of the flag in BU.

Each functional block used in the description of the embodiments of the present invention as given above can be realized as LSI (Large Scale Integration), typically represented by the integrated circuit. These may be produced as one chip individually or may be designed as one chip to include a part or all. Here, it is referred to as LSI, while it may be called IC, system LSI, super LSI, or ultra LSI, depending on the degree of integration.

Also, the technique of integrated circuit is not limited only to LSI and it may be realized as a dedicated circuit or a general-purpose processor. FPGA (Field Programmable Gate Array), which can be programmed after the manufacture of LSI, or a reconfigurable processor, in which connection or setting of circuit cell inside LSI can be reconfigured, may be used.

Further, with the progress of semiconductor technique or other techniques derived from it, when the technique of circuit integration to replace LSI may emerge, the functional blocks may be integrated by using such technique. For example, the adaptation of biotechnology is one of such possibilities.

INDUSTRIAL APPLICABILITY

The network node and the mobile terminal according to the present invention provide such effects that the mobile node having a plurality of interfaces, with which an operator is performing communication according to the flow information defined by a policy, can carry out communication by selecting an interface suitable for the flow, and the invention can be applied to the communication technique using IP or routing technique to change the route of flow.

The invention claimed is:

1. A terminal apparatus, comprising:
    a plurality of interfaces;
    a memory which, in operation, stores flow information including: (i) flow identification (ID) information identifying a traffic flow which is transmitted or received by a first interface of the plurality of interfaces, and (ii) network identification (ID) information identifying a second access network which is connected to a second interface of the plurality of interfaces different from the first interface; and
    circuitry coupled to the memory, wherein the circuitry, in operation:
        identifies the second access network for routing said traffic flow based on the flow information; and
        moves said traffic flow from a source access network connected to the first interface to the second access network connected to the second interface.

2. The terminal apparatus according to claim 1, wherein the second access network is a trusted access network.

3. The terminal apparatus according to claim 1, wherein said traffic flow is limited to being transmitted or received in the second access network only.

4. A terminal apparatus, comprising:
    a plurality of interfaces;
    a memory which, in operation, stores flow information including: (i) flow identification (ID) information identifying a traffic flow which is transmitted or received by a first interface of the plurality of interfaces, and (ii) network identification (ID) information identifying one or more access networks; and
    circuitry coupled to the memory, wherein the circuitry, in operation:
        identifies a second access network connected to a second interface of the plurality of interfaces different from the first interface as an access network for routing said traffic flow in response to the network ID information identifying the second access network; and
        moves said traffic flow from a source access network connected to the first interface to the second access network connected to the second interface.

5. The terminal apparatus according to claim 4, wherein the second access network is a trusted access network.

6. The terminal apparatus according to claim 4, wherein said traffic flow is limited to being transmitted or received in the second access network only.

* * * * *